Nov. 10, 1970 J. G. STONE 3,539,409

METHOD OF MAKING LONG LENGTHS OF EPOXY RESIN INSULATED WIRE

Original Filed Sept. 21, 1966

INVENTOR

John G. Stone

BY Dedio and Montgomery

ATTORNEYS

United States Patent Office 3,539,409
Patented Nov. 10, 1970

3,539,409

METHOD OF MAKING LONG LENGTHS OF EPOXY RESIN INSULATED WIRE

John G. Stone, North Haven, Conn., assignor to Cerro Corporation, New York, N.Y., a corporation of New York Original application Sept. 21, 1966, Ser. No. 581,051. Divided and this application June 11, 1968, Ser. No. 767,860
Int. Cl. H01b *13/08*
U.S. Cl. 156—56 7 Claims

ABSTRACT OF THE DISCLOSURE

This invention is directed to a method of making long lengths of insulated wire which includes the steps of wrapping a layer of uncured flexible epoxy resin coated tape over a conductor, placing a covering layer about said tape layer, winding said conductor, said tape and said covering layer on a frame and then heating the same to cure the epoxy resin coated tape to form a homogeneous continuous wall about said conductor.

This is a divisional application of parent U.S. patent application Ser. No. 581,051 filed Sept. 21, 1966, now abandoned.

This invention relates to insulated wire and cable and more particularly to epoxy resin insulated wire and cable and methods for making long lengths of the same.

The electrical, mechanical and heat-resistant properties of epoxy resin insulation systems are well known in the electrical equipment industry and their advantages over previous insulation systems are recognized. Many manufacturers use epoxy coated magnet or very small diameter wire for winding coils. They also use epoxy or epoxy impregnated materials for slot liners or tapes for insulating coils and for dip-coating systems for impregnating and encapsulating electrical devices to make them impervious to the effects of moisture and oils. Up until now there has been no practical method of manufacturing large diameter wires with impervious epoxy insulations suitable for use as power supply leads to the above-mentioned electrical devices.

In manufacturing magnet wire, a bare conductor is passed through a dip of liquid epoxy or an epoxy enamel where a thin film of the epoxy material is deposited on a conductor. The conductor then passes through an oven where the film is dried and/or cured. This process may be repeated until the desired thickness has built up. Since the voltage stresses on magnet wire insulations are very small, only very thin film thicknesses are required. The thicknesses may range from a few tenths of a mil to several mils, depending upon the conductor size and application. With these thicknesses the films are flexible enough to permit winding of the wire into coils. This method of insulating wire with epoxy is not practical for producing the heavy thicknesses required for power lead wire and, furthermore, in most cases the dip-deposited epoxies are not flexible enough in thick sections to withstand the rigours of installation. Another disadvantage is that dip-deposited insulating films are subject to frequent discontinuities and resulting electrical faults. It is standard industry practice for this type of wire, to specify the permissible number of electrical faults per hundred feet of conductor. By the term power lead, reference is made particularly to conductors in sizes ranging upward from No. 20 AWO (.03″) diameter to 500 MCM (.8″) diameter or larger, which may withstand voltage stresses of 600 v. or greater.

Other epoxy insulated wires have employed insulations built up with layers of fully cured epoxy impregnated fabric tapes. In these wires flexibility is dependent upon the width and angle of application of the tapes and the ability of the tapes to slide across each other when the wire is flexed. In these constructions it is frequently necessary to coat the tapes with a lubricant or slipper compound to provide the required flexibility. Since the insulation on wire of this type is not homogeneous, the insulating properties are greatly affected by water, moisture, humidity or other fluid media.

In view of the foregoing, it is an object of this invention to provide a new and improved epoxy resin insulated wire.

Another object of this invention is to provide a new and improved insulated wire having a cured, continuous, homogeneous epoxy wall positioned about the conductor.

Another object of this invention is to provide a new and improved method of manufacturing continuous lengths of epoxy resin insulated wire.

Still other objects and advantages of the invention will in part be obvious and will in part be apparent from the specification.

For a fuller understanding of the nature and objects of the invention, reference is had to the following description taken in conjunction with the accompanying drawings in which the same reference numerals indicate like or corresponding parts in the several views and in which.

Figure 1:
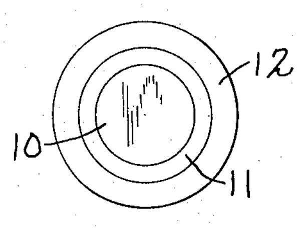
FIG. 1 is an enlarged cross-sectional view of the insulated wire in accordance with the invention.
Figure 2:
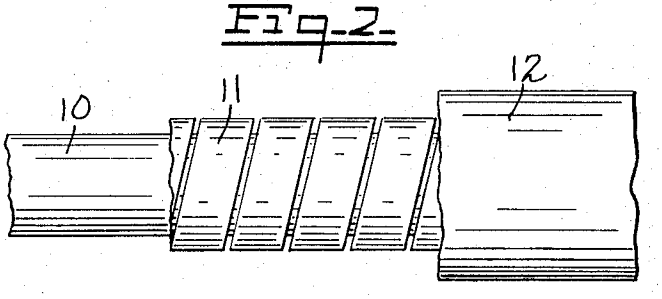
FIG. 2 is a side break-away view of the insulated wire according to the invention, with the successive layers cut away to show the structure prior to curing.
Figure 3:
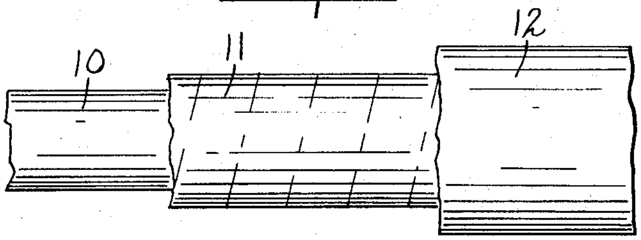
FIG. 3 is a view similar to FIG. 2, but after curing of the epoxy resin layer.

Referring to FIGS. 1–3, the insulated wire or conductor of this invention includes a metallic conductor 10, preferably of tin-coated stranded copper material. The tin on the outside surface of the copper central conductor which may, itself, be stranded or solid, is utilized to assist in permitting soldering to take place. It is to be understood that any other conventional metallic conductor may also be employed as, for example, silver, silver-plated copper, copper by itself, or conductive alloys, i.e. stainless steel. It is also to be understood that strands of the above-mentioned materials can be utilized to form the conductor or, if desired, a solid material conductor may also be utilized.

The first step in manufacturing the insulated conductor according to this invention, involves wrapping a B-stage or uncured epoxy impregnated fabric tape 11 about said conductor. In the art, "B-stage" means a partly cured epoxy which is solid at room temperature and which, upon heating, melts and then sets to form a homogeneous continuous mass.

Applicant has discovered that B-stage epoxy saturated flexible tapes may be used in the manufacture of the insulated conductor according to the invention. Preferably, Fibremat V brand or Vartex brand flexible uncured epoxy tape is used in this invention, although other flexible uncured epoxy tapes may also be used. Fibremat V is manufactured by the 3-M Company of St. Paul, Minn. Fibremat V comprises a non-woven polyester web tape, saturated and coated with an uncured B-stage flexible epoxy. The non-woven, reinforced web backing preferably comprises polyethylene terephthalate fibers. The epoxy used on the tape is preferably derived from bisphenyl glycidyl ether type of polyepoxide which is combined with a hardener. Vartex brand tapes are produced by the New Jersey Wood Finishing Company and bear the trademark Vartex. Vartex brand tapes, Series BE 200, 210 and 220, which are B-stage epoxy resin tapes with either a glass cloth base, a non-woven polyester material reinforced base, or a polyester glass base, may be utilized according to this invention.

As noted above, the supporting fabric for the epoxy resin may be of woven glass cloth, woven polyester cloth, cloth woven from a combination of glass and polyester yarns, or non-woven polyester web, either with or without polyester reinforcing threads. The preferred fabric is the reinforced non-woven web in which polyester fibers are matted or felted in random array and are reinforced in the machine direction with linearly-aligned polyester yarns made of continuous filament. This structure is thermally bonded without the addition of adhesives or low melting point fibers which might be incompatible or weaken the structure at elevated temperatures. This supporting fabric for the epoxy has been found to have excellent conformity when used in tape wrapping operations. All fibers and filaments used in a non-woven reinforced web fabric are preferably made of polyethylene terephthalate resin.

After the epoxy tape is wrapped over the conductor, a covering layer 12 is then preferably placed over the epoxy tape to make possible the production of insulated wire in long continuous lengths. In the prior art, the lengths of insulated wires were limited to the size of the curing oven and the amount of wire which could be suspended or festooned therein without contacting itself or the interior of the oven. In the liquid phase the epoxy will attach itself to anything it contacts and will subsequently cure in place. By the addition of preferably a tape wrap or braid covering over the epoxy insulation, effective isolation is provided for the epoxy during the curing cycle and it therefore becomes possible to wind conveniently long lengths of the wire on a metal reel or frame and place it in an oven for curing. Thus it can be seen that the only limits on the length of the wire to be produced are the size of the reel, the amount of wire which will fit thereon, and the size of the curing oven. In fact continuous lengths of several thousand feet which are convenient for efficient manufacture are readily processed in this manner.

The covering layer for the epoxy resin tape may comprise glass, quartz, asbestos, polyester, mica, or the like, which may be either wrapped, braided or woven, or may comprise various combinations thereof. Additionally, tapes of fluorocarbon film, polyester film, braids or woven fabric of the same, may also be utilized. Further, polyimide film, such as Kapton type H film made by Du pont may also be used, as well as Teflon, FEP, or Kapton type HF or HI. Other materials may also be utilized, such as cellulose triacetate, polyamide, polycarbonate, polypropylene, polyimide, polysulfone, polyphenylene oxide, chlorinated polyether and polytrifluorochloroethylene.

In certain instances it has been found desirable to provide external pressure in order to eliminate voids in the cured epoxy insulation. To accomplish this, the epoxy insulation is preferably enclosed in a covering layer 12 of heat-shrinkable material. The layer 12 is provided preferably by a tape wrap of heat-shrinkable film applied helically with a preferable minimum of 10% overlap to prevent the epoxy from escaping through the tape wrap.

During the curing cycle, as the epoxy resin softens and melts, the heat-shrinkable layer contracts in the direction of the axis of the wire, resulting in the application of external radial pressure on the surface of the epoxy layer, such that the epoxy flows into any voids which may have existed prior to curing. In the preferred embodiment, the heat-shrinkable material used is polyethylene terephthalate, such as Do pont type T Mylar. Other materials, such as other polyester films, or fluorocarbon film such as Cylsar 100 EH 30, or Teflon (both Du pont), may also be used for the same purpose. The films are generally treated by the manufacturer to permit them to act as heat-shrinkable material. Other materials which may also be utilized are cyclohexylenedimethylene terephthalate, polyvinyl alcohol, regenerated cellulose, polytetrafluoroethylene, fluorinated ethylene propylene, polyvinylidene fluoride and irradiated polyethylene. The last-mentioned materials have either a natural shrink propensity or may be processed so that they will shrink at elevated temperatures when external pressure is desired.

In order to cure the epoxy tape covered wire having the covering layer thereon, the combination is placed in an oven, such as a hot air oven, and is then heated to a temperature above about 125° C. to below about 200° C. At 200° C. the time required to cure the B-stage epoxy is approximately 1 hour, whereas at 125° C. the curing time of the epoxy is approximately 36 hours. The preferable temperature utilized is not greater than 175° C. inasmuch as if a tin covered wire is used, serious degradation of the tin takes place at above about 175° C. At this temperature approximately 6 hours are required to cure the B-stage epoxy resin tape to form a homogenous mass.

It has also been discovered that when flexible electrical conductors are utilized which have irregular surfaces and which contain comparatively large amounts of air spaces, the epoxy tends to flow toward the conductor voids during the liquid stage cure, thus decreasing the amount of epoxy in the insulating wall and increasing the possibility of forming paths through the insulation for the entrance of moisture and subsequent leakage of electricity through the insulation. It has been discovered that this condition can be corrected by employing a barrier layer between the conductor and the epoxy tape. It has been further discovered that the use of a barrier layer acts as a thermal barrier for the insulation from the conductor heat as well as providing increased resistance to mechanical damage such as may be encountered during installation. The barrier layer may be composed preferably of felted asbestos or tape of polyester, i.e. Mylar, or fluorocarbon film. Other materials may also be utilized as the barrier layer, such as cellulose triacetate, polyamide, polycarbonate, polypropylene, polyimide, polysulfone, polyphenylene oxide, chlorinated polyether, polytrifluorochloroethylene, polyethylene terephthalate, cyclohexylenedimethylene terephthalate, polyvinyl alcohol, regenerated cellulose, polytetrafluoroethylene, fluorinated ethylene propylene, polyvinylidene fluoride and irradiated polyethylene.

Referring again to FIGS. 1, 2 and 3, it may be observed that the conductor is shown at 10, the tape is shown at 11 prior to curing in FIG. 2, and after curing in FIG. 3, with the covering layer shown at 12.

Figure 4:
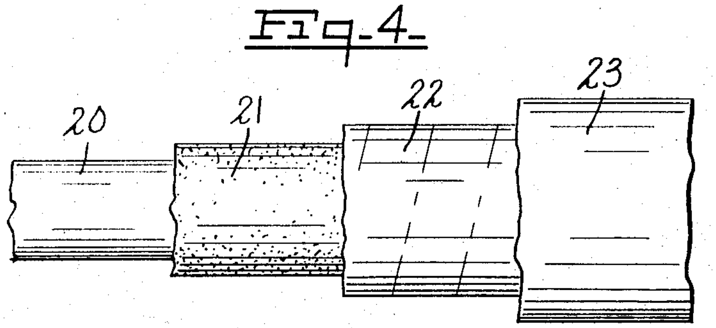
FIG. 4 is a side view of an alternate embodiment of the insulated wire according to the invention, with successive layers cut away to show the structure.

FIG. 4 shows the conductor 20, with the barrier layer 21, the tape layer 22, and a covering layer 23.

Utilizing the above method, long continuous lengths of wire may be produced using B-stage epoxy resin tape. The insulated wire produced herein is of the type which may be used as connection between electrical components, wherein 600 volts or greater must be withstood. Using the method of this invention, wire having a diameter not less than about .030", as well as wire having a diameter as great as 1", may easily be produced. It is to be understood that the insulated wire produced herein is of power size, rather than low voltage magnet type wire as disclosed in the prior art.

It will thus be seen that the objects set forth above, among those made apparent from the preceding description are efficiently attained and since certain changes may be made in carrying out the foregoing method and in the article set forth without departing from the spirit and scope of the invention, it is intended that all matter contained in the above description and shown in the accompanying drawing shall be interpreted as illustrative and not in a limiting sense.

It will also be understood that the following claims are intended to cover all of the generic and specific features of the invention herein described and all statements of the scope of the invention which, as a matter of language, might be said to all therebetween.

What is claimed is:

1. A method for making long lengths of flexible insulated electrical wire which comprises the steps of, wrapping a layer of a partially cured flexible epoxy resin over a conductor, said conductor having a diameter greater than about .030" but less than about 1.0", said layer of partially cured flexible epoxy resin including a supporting material having a partially cured flexible epoxy resin therein, the supporting material chosen from the group consisting of woven glass cloth, woven polyester cloth, a non-woven polyester web with re-enforcing threads and cloth woven from a combination of glass and polyester yarns, wrapping a layer of heat-shrinkable material over said epoxy resin layer, said heat-shrinkable layer selected from the group consisting of polyesters, halogen substituted alkene polymers, halogen substituted alkene copolymers, polyethylene terephthalate, cyclohexylenedimethylene terephthalate, polyvinyl alcohol, regenerated cellulose, polytetrafluoroethylene, fluorinated ethylene propylene, polyvinylidene fluoride, and irradiated polyethylene, said layer of heat-shrinkable material is wrapped about said flexible epoxy resin layer such that the heat-shrinkable layer overlaps about itself by at least ten percent, and thereafter curing said layer-covered conductor by heating it to a temperature from about 125° C. to 200° C.

2. The method of claim 1, further comprising winding said conductor having said layers of epoxy resin and heat-shrinkable material thereon onto a frame and positioning said frame in an oven so as to cure said layers.

3. The method of claim 2, further comprising applying a barrier layer about said conductor prior to wrapping said layer of flexible epoxy resin on said conductor.

4. The method of claim 1, wherein said frame having the insulated conductor thereon is placed in an oven which is maintained at a temperature within the range of 125° C. to about 175° C.

5. The method of claim 3, wherein said barrier layer comprises felted asbestos fiber.

6. The method of claim 1, wherein the curing time is one to thirty-six hours.

7. The method of claim 3, wherein the barrier layer is formed from a material selected from the group consisting of fluorocarbon film, cellulose triacetate, polyimide, polycarbonate, polypropylene, polysulfane, polyphenylene, oxide, fluorinated polyether, polytrifluorochloroethylene, polyethylene terephthalate, cyclohexylenedimethylene terephthalate, polyvinyl alcohol, regenerated cellulose, polytetrafluoroethylene, fluorinated ethylene propylene, polyvinylidine fluoride and irradiated polyethylene.

References Cited

UNITED STATES PATENTS

| | | | |
|---|---|---|---|
| 2,038,377 | 4/1936 | Obermaier et al. | |
| 2,090,510 | 8/1937 | Bower | 174—127 X |
| 2,956,613 | 10/1960 | Edelman et al. | |
| 3,033,727 | 5/1962 | Cram et al. | 156—56 |
| 3,041,673 | 7/1962 | Goodwine | 156—51 |
| 3,297,970 | 1/1967 | Jones | 174—120 X |

VERLIN R. PENDEGRASS, Primary Examiner

U.S. Cl. X.R.

176—120